Patented Jan. 5, 1937

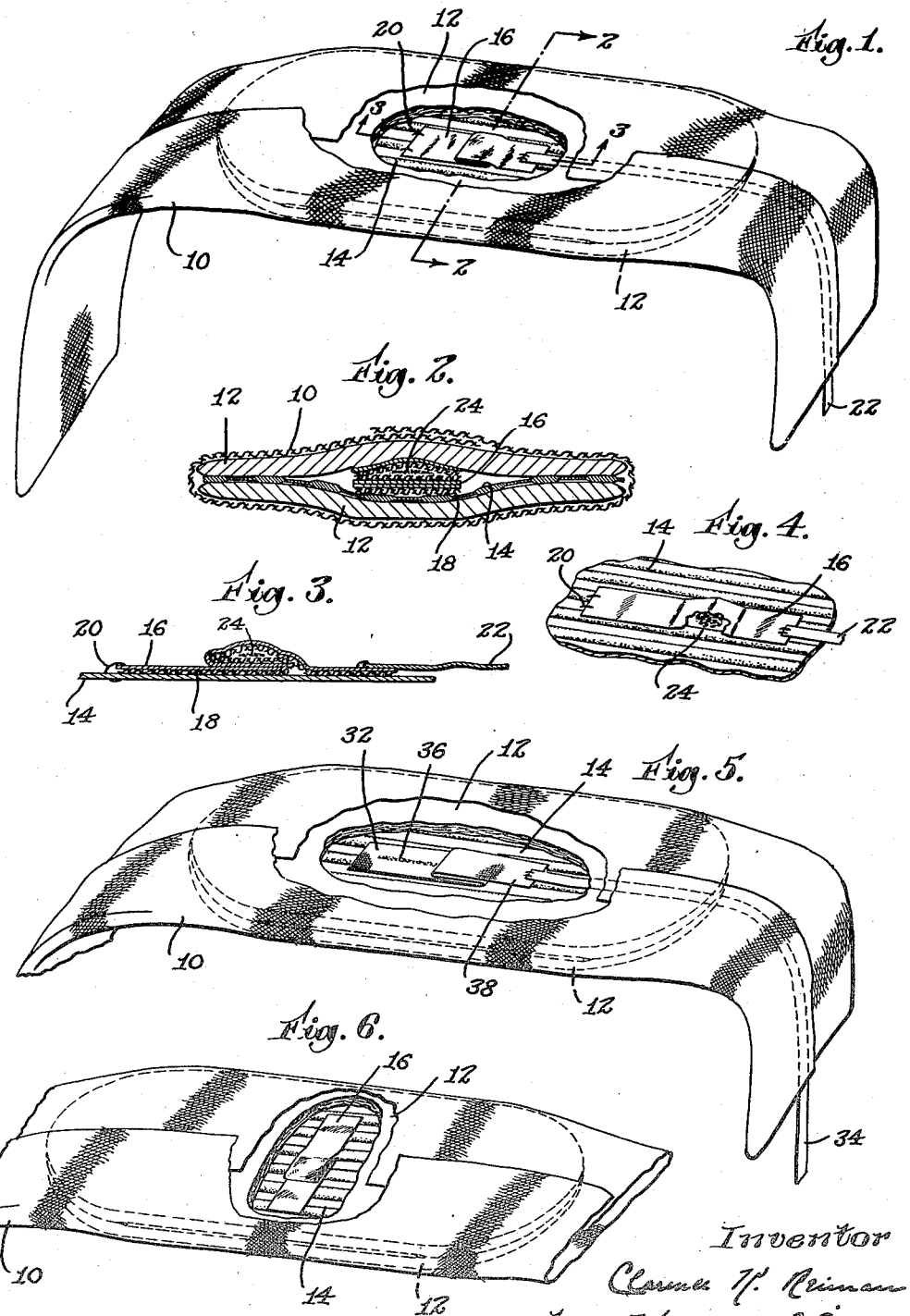

2,066,946

UNITED STATES PATENT OFFICE 2,066,946

DEODORIZING AND STERILIZING BANDAGE

Clarence K. Reiman, Newton, Mass.

Application March 8, 1934, Serial No. 714,589

3 Claims. (Cl. 167—84)

This invention consists in a novel deodorizing and sterilizing bandage, which, with minor variations in form, is applicable to two important and different fields—in catamenial bandages or sanitary napkins, where protection from odor is a paramount necessity, and in surgical dressings where a dry bandage is required that will not only be sterile of itself but which will aid in sterilizing and in maintaining sterile the open wound itself. Such a dressing is of the greatest value and importance for field use in war-time.

The prior art literature and patents are full of disclosures of sterile dressings, sterilizing applications, deodorizing catamenial bandages, deodorizing and sterilizing preparation for body odors, sanitary napkins impregnated with a "sweet smelling disinfectant", and the like, until there is actually considerable confusion in the mind of not only the public but of the medical world concerning these matters. A few words explaining and defining these terms will make clearer the novelty and important advance in the art effected by the present invention.

Perspiration odors require soap and water first, and then the application of a mild disinfectant to prevent the growth of bacteria, which grow in the solid material excreted from the pores in perspiring and produce odor. Such preparations are usually improperly called deodorants. "Sweet smelling antiseptics" used for the purpose of eliminating odors are ineffective except insofar as they are actually mild germicides and do destroy the bacteria at the seat of the trouble. Most of these materials merely tend to cover up the unpleasant odor with a more pleasant odor, and this cannot be considered a solution of the body odor problem.

A sterile dressing or bandage is prepared and packed so that no pathogenic or other bacteria are present in it. Once opened and handled, the bandage is no longer sterile. A sterilizing bandage is not only sterile itself but contains some active disinfecting material that maintains its own sterile condition and is effective in actually disinfecting the wound or part treated.

In the deordorizing catamenial bandages of my invention, I avoid the mistake of trying to cover up one odor by another and actually bring about the complete destruction of the odor itself with an active chemical, or, as a variation of this, the complete adsorption of the odor in activated char, silica gel, or other similar porous adsorptive material suited to this purpose. In the deodorizing of catamenial bandages, the problem is not at all the disinfecting or sterilizing of the discharged menstrual fluids. In a normal person free from disease, these fluids are sterile when discharged. Under some circumstances these fluids may become infected and a secondary odor would then be produced, so that some sterilizing action is desirable as a safeguard, but this action itself does not eliminate odor. The actual odor that generally accompanies menstrual discharge comes from two sources, (1) from the excretion of small glands that function during this period, and (2) from decomposing protein material not necessarily due to bacterial processes, of much the same type that is noticed during the healing of a large sterile wound. Differences in amount of annoyance from the resulting odor between individuals generally concerns the difference in activity of these glands.

In order to destroy such an organic odor by means of chemicals, it is apparent that the chemicals concerned must be very active materials, and further they must be well dispersed throughout the body of the napkin. More specifically, the chemical used should be a powerful oxidizing agent, and this increases the difficulty of dispersing it throughout the body of the sanitary napkin, since these articles are usually composed of cotton or other cellulosic material and are, therefore, liable to be impaired or partially destroyed by oxidation.

In the preferred exemplification of my invention, both as a deodorizing catamenial bandage and as a sterilizing surgical dressing, I use dry powdered calcium hypochlorite as the active chemical. This material in a relatively pure form, analyzing about 66% available chlorine, can now be purchased in the open market. Other hypochlorites may be successfully used, and so may hypobromites for that matter, although for most cases calcium hypochlorite is superior. These materials are superior to powerful oxidizing agents, like perborates, peroxides and the like, in that the gases chlorine or bromine, slowly evolved from the hypochlorites (or hypobromites) by the gradual reaction with the $CO_2$ (carbon dioxide) of the air, are themselves the effective deodorizing and sterlizing agents, and being gases they permeate the entire mass of the bandage. Thus it is impossible for the odors from the menstrual flow to pass the catamenial bandage without coming in contact with the active gas and being destroyed. In the case of the surgical dressing, these same gases pass through the bandage and come in contact with and dissolve in the body fluids of the wound, and assist powerfully in disinfecting the wound.

Hypochlorites used in this manner have particular merit, not only in that they produce gaseous chlorine, which penetrates all parts of the bandage and even to the parts of the body covered by it, but because chlorine is one of the best deodorizing materials known, due to its oxidizing action, and is everywhere accepted as a standard disinfectant. Moreover, chlorine in moderate concentration does not irritate the skin or mucous membranes, as is shown by the fact that Carrel-Dakin solution is widely used, particularly in war hospitals, for irrigating open wounds and infected areas of mucous membrane. Chlorine gas, in small amounts, dissolved in body fluids forms to all intents and purposes a Carrel-Dakin solution.

I have discovered that from two to three grains of the pure calcium hypochlorite, centrally disposed in any of leading brands of commercial sanitary napkins, will completely eliminate the odor normally present without producing any perceptible chlorine odor and without in any way producing irritation of the parts of the body affected even when napkins are worn for the entire period. Moreover, the action of the hypochlorite completely prevents the development of any odor in the used napkin and, therefore, greatly increases the peace of mind of the individual concerned.

An important feature of the present invention resides in the manner of preserving the active chemicals, like the calcium hypochlorite, out of contact with the materials of the napkin or bandage, and out of contact with the air, until such time as the bandage is to be put in use. This is essential since vigorous oxidizing agents will actively react with such reducing agents as cellulosic fibres, particularly if the temperature is raised, and beyond that, the carbon dioxide of the air will react with hypochlorites, unless they are sealed so as to exclude the air. The desired results may be secured by preparing a small envelope or package of paper alone or in combination with a reinforcing element completely impregnated with paraffin, and placing inside this envelope the active chemical. The envelope may be sealed by gently heating the paraffin and pressing the edges of the envelope together. This sealed envelope, with the active chemical enclosed, is then placed between the layers of cellulose fibres in the center of the napkin or bandage and remains sealed until ready to put into use. At that time the seal or the package itself may be broken in any one of several ways and some chlorine gas is immediately released. Thereafter the chlorine will continue to be released slowly by the action of the carbon dioxide of the air as long as there is any of the hypochlorite left. When sealed up in the envelope, however, the calcium hypochlorite is stable and may keep without important change for long periods of storage.

The envelope or insert prepared in this manner or in some equivalent manner in automatic packaging machinery, is inserted between the layers of cellulose filler near the center of the napkin, in the machine that wraps up the filler with the gauze covering. In this position, packed in a light cardboard box, it is free from distortion until it reaches the consumer and no chlorine will be lost during this period. When the napkin is to be put into use, it is advisable to hold it at the central portion between the thumb and forefinger of both hands and bend the napkin back and forth gently, so as to break the seal of the envelope. When this is the method employed, the insert is preferably placed in the napkin near the center, with the longest dimension of the insert crosswise of the napkin. If desired, the insert can be placed lengthwise of the napkin and can be clipped to the napkin at one end. To the other end of the insert is clipped a ribbon or string and this is led out through one end of the assembled napkin, like a rip-cord, in convenient location for the user to pull and so open the envelope without disturbing the structure of the napkin.

These and other features of the invention will be best understood and appreciated from the following description of a preferred embodiment thereof, selected for purposes of illustration and shown in the accompanying drawing, in which Fig. 1 is a view in perspective of a catamenial bandage with portions broken away;

Fig. 2 is a view in cross section, on an enlarged scale, on the line 2—2 of Fig. 1;

Fig. 3 is a fragmentary view in longitudinal section showing the package in partially opened condition;

Fig. 4 is a fragmentary view in perspective, on a smaller scale, showing the package of Fig. 1 fully opened;

Fig. 5 is a view in perspective of a catamenial bandage having an alternative form of package therein; and Fig. 6 is a view similar to Fig. 1 showing the package differently arranged.

The body of the bandage herein shown comprises a folded gauze covering 10 in which is enclosed a pair of pads or bats 12 of cotton or other soft absorbent fibre. Between the pads 12 is disposed a sheet 14 of cellulose or cotton fibre corresponding in outline substantially to that of the pads 12. The folded gauze covering 10 extends a substantial distance beyond the ends of the superposed pads 12.

The form of package employed is of secondary importance only so long as it is flexible, substantially vapor-proof and easily unsealed or broken. One satisfactory form of package is shown in Figs. 1 to 4. This comprises a sheet or strip 16 of thin waxed paper having loosely united to one surface thereof a strip of gauze 18. The composite sheet thus formed is thus given some toughness without interfering with its flexibility and a roughened surface is presented by the thread of the gauze. In the form herein shown, the package or envelope is formed by doubling the composite strip twice upon itself, and into one or more of the folds thus formed is introduced about 2 grains of calcium hypochlorite 24. The package or envelope may be sealed in its folded condition by the application of pressure and sufficient heat slightly to melt the paraffin of the paper. The package thus produced is secured in place about half way between the ends of the bandage by one or more stitches at one end of the package, and to the other end of the package is attached a cord or ribbon 22 which is led out between the pads 12 and projects slightly beyond the folded end of the gauze covering 10. It will be understood that the package is placed within the bandage when the latter is assembled and that the only indication of its presence is the end of the cord or ribbon 22. The active chemical agent is thus sealed against atmospheric contact and is maintained intact for long periods of storage. Prepartory to use, it is necessary only to pull the projecting end of the ribbon 22, whereupon the folds of the package are broken apart and the strip from which it is formed is straightened out, as shown in Fig. 4. In this operation, the calcium hypochlorite 24 is fully exposed and distributed upon the surface of the absorbent sheet 14. It immediately starts to react with the $CO_2$ of the atmosphere and to liberate chlorine gas. This process continues in a uniform manner, maintaining a constant concentration of chlorine gas, there being a constant vapor pressure of chlorine over the calcium hypochlorite so long as any of the latter remains. The amount of $CO_2$ reaching the hypochlorite will be practically constant, since equilibrium conditions exist throughout its entire period of use.

The construction shown in Fig. 6 is similar to that above explained except that the package is placed crosswise in the bandage and the rip cord is dispensed with. In this latter case, the package may be unsealed by bending the bandage back and forth between the fingers or it may be left to open automatically on account of the flexed position it assumes in the bandage and the fact that the paraffin seal is softened by the heat of the body.

When deodorizing and sterilizing chemicals are used which yield a gaseous active product, the size of the insert or envelope is unimportant, since the gas penetrates all parts of the bandage. When materials are used which lack this property, the shape and size and position of the insert become of greater importance. For example, when perborates are used, I prefer to use an elongated insert 32, constructed more like that shown in Fig. 5, having a relatively long flap 38 which may be removed when the bandage is put into use by pulling on the ribbon or cord 34 attached to the flap. Thus a large area of the active chemical 36 is exposed. This longer insert should be placed centrally in the napkin or bandage and should extend lengthwise of the bandage for perhaps two-thirds of its length. The insert should be narrow so that an excessive amount of the perborate, for example, is not required to fill the insert. When using perborate of sodium, about 2 grams (rather than 2 grains) is required to prevent the passage of odors during use.

For a sterilizing emergency bandage (wartime gunshot wounds, accidents, first aid dressing and the like) the hypochlorite is obviously most useful. It is inadvisable to place any liquids in such a wound as an emergency measure, for fear of carrying any superficial infection deeper into the wound. Generally first aid treatment in such cases is confined to placing a sterile bandage over the wound to keep out further dirt and to aid in forming a clot to stop bleeding. With the sterilizing bandage of this invention, particularly when a material yielding a gaseous germicidal chemical is present, the further advantage of effecting a certain degree of disinfection of the wound itself is obtained. Chlorine gas used in this way in low but constant concentration is advantageous in many ways. It is non-irritating, there is no extraneous liquid added to carry infection deeper into the wound, the chlorine dissolves in the body fluids and forms practically a Carrel-Dakin solution (isotonic salt solution, plus a small amount of alkalinity, plus chlorine). Beyond this, the bandage, since it is applied dry, has all the advantages of the ordinary sterile pad generally used in its ability to absorb fluids excreted from the wound and to aid in forming a clot.

A surgical or emergency dressing of this type should carry a larger amount of the pure hypochlorite than the 2 grains, which suffice for use in a catamenial bandage. Preferably this powder should be distributed in two or more inserts so as to distribute the evolved chlorine to better advantage, particularly in bandages of larger size, and, since such bandages will be packed under sterile conditions and will be wrapped in sterile containers, it is inadvisable to depend on a distortion of the bandage by manipulation between the fingers to break the seal of the insert. Therefore such inserts should be opened when the bandage is put into use by means of an attached ribbon or some form of a rip cord.

When an adsorbent agent is used, such as silica gel, the quantity may be from 2 to 5 grams and it may be packaged as shown in Fig. 5, so as to distribute it over a considerable length of the bandage.

It will be understood that in a broad aspect my invention contemplates the employment in a dry state of any one of three different types of chemical agent—first, agents capable of reacting with the air to liberate an oxidizing gas, such as calcium hypochlorite or calcium hypobromite; second, agents whose action is oxidizing but not gaseous, such for example, as a perborate or peroxide; and third, agents which are active adsorbents, such as silica gel or activated charcoal. Agents of all three types are effective for removing odors, although perhaps to somewhat varying degrees, and the first two are similar in the respect that their action is of an oxidizing nature.

In addition to the complete and assembled bandage or dressing herein disclosed, my invention includes within its scope the novel package or envelope sealed with its active chemical agent therein and ready to be incorporated in the bandage or dressing.

Having thus described my invention, what I claim as new and desire to secure by Letters Patent is:

1. A catamenial bandage comprising a body of absorbent material encased in a textile cover, said bandage containing a concealed flexible envelope which is substantially non-absorbent, inert chemically and moisture- and gas-proof, and a small quantity of calcium hypochlorite sealed within said envelope, and adapted to liberate free chlorine upon interaction with the components of the atmosphere when the seal of the envelope is broken and while remaining substantially dry.

2. A catamenial bandage comprising a body of absorbent material encased in a textile cover, said bandage containing a concealed flexible envelope which is substantially non-absorbent, inert chemically and moisture- and gas-proof, and a small quantity of an active agent sealed within said envelope and adapted to liberate an oxidizing gas upon interaction with the components of the atmosphere while remaining substantially dry and when the seal of the envelope is broken.

3. An insert comprising a flexible envelope that is substantially chemically inert, moisture- and gas-proof, and sealed with a material that softens at body temperature, said envelope containing a small quantity of calcium hypochlorite and being adapted to preserve the same out of contact with the components of the atmosphere until the seal is broken, the insert being suitable for insertion between the layers of a bandage.

CLARENCE K. REIMAN.